(12) United States Patent
Brùse et al.

(10) Patent No.: US 12,349,693 B2
(45) Date of Patent: Jul. 8, 2025

(54) OIL COMPOSITIONS

(71) Applicant: CARGILL, INCORPORATED, Wayzata, MN (US)

(72) Inventors: Falk Brùse, Drensteinfurt (DE); Marcus Bernardus Kruidenberg, Oostvoorne (NL)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 16/196,040

(22) Filed: Nov. 20, 2018

(65) Prior Publication Data

US 2019/0082710 A1    Mar. 21, 2019

Related U.S. Application Data

(60) Division of application No. 15/334,729, filed on Oct. 26, 2016, which is a continuation of application No. 13/984,562, filed as application No. PCT/EP2012/000593 on Feb. 9, 2012, now abandoned.

(30) Foreign Application Priority Data

Feb. 10, 2011    (EP) .................................... 11001076

(51) Int. Cl.
| | | |
|---|---|---|
| A23D 9/04 | (2006.01) | |
| A23L 2/52 | (2006.01) | |
| A23L 5/20 | (2016.01) | |
| A23L 33/115 | (2016.01) | |
| C11B 3/00 | (2006.01) | |
| C11B 3/10 | (2006.01) | |
| C11B 3/12 | (2006.01) | |

(52) U.S. Cl.
CPC .................. *A23D 9/04* (2013.01); *A23L 2/52* (2013.01); *A23L 5/21* (2016.08); *A23L 5/273* (2016.08); *A23L 33/115* (2016.08); *C11B 3/001* (2013.01); *C11B 3/10* (2013.01); *C11B 3/12* (2013.01); *A23V 2002/00* (2013.01)

(58) Field of Classification Search
None
See application file for complete search history.

(56) References Cited

U.S. PATENT DOCUMENTS

| | | | | |
|---|---|---|---|---|
| 2,594,953 | A * | 4/1952 | Mares ...................... | C11B 3/001 203/79 |
| 4,089,880 | A * | 5/1978 | Sullivan .................. | C11B 3/001 554/176 |
| 5,434,278 | A * | 7/1995 | Pelloso .................... | A21D 2/16 554/165 |
| 2004/0210070 | A1 | 10/2004 | Kruidenberg et al. | |
| 2012/0238770 | A1 * | 9/2012 | Bloomer .................. | C11C 3/10 554/175 |
| 2013/0323394 | A1 * | 12/2013 | Bruse ....................... | C11B 3/10 426/590 |

FOREIGN PATENT DOCUMENTS

| | | |
|---|---|---|
| AU | 2012216164 B2 | 1/2016 |
| CN | 102010786 A | 4/2011 |
| EP | 1505145 A1 | 2/2005 |
| EP | 2594625 A1 | 5/2013 |
| EP | 2738243 A1 | 6/2014 |
| EP | 3056558 A1 | 8/2016 |
| EP | 2471897 B1 | 10/2017 |
| EP | 2548941 B1 | 6/2018 |
| EP | 2672834 B1 | 7/2018 |
| EP | 3388502 A1 | 10/2018 |
| EP | 3398450 A1 | 11/2018 |
| EP | 3321348 B1 | 12/2019 |
| GB | 0707454 A | 4/1954 |
| GB | 707545 A | 4/1954 |
| JP | 2011040539 A1 | 4/2011 |
| WO | 2006094622 A1 | 9/2006 |
| WO | 2008005032 A1 | 1/2008 |
| WO | 2010036450 A1 | 4/2010 |
| WO | 2010063450 A1 | 6/2010 |
| WO | 2011009643 A1 | 1/2011 |
| WO | 2011009841 A1 | 1/2011 |
| WO | 2011/055732 A1 | 5/2011 |
| WO | 2011069028 A1 | 6/2011 |
| WO | 2011114862 W | 9/2011 |
| WO | 2012/006950 A1 | 1/2012 |
| WO | 2012/010723 A1 | 1/2012 |
| WO | 2012/065790 A1 | 5/2012 |
| WO | 2012107230 A1 | 8/2012 |

OTHER PUBLICATIONS

Schurz: WO 2010/063450 A1, Jun. 10, 2010. (Year: 2010).*
Bertoli: WO 2011/009841, Jan. 27, 2011. (Year: 2011).*
Bloomer: U.S. Appl. No. 61/266,780, filed Dec. 4, 2009 (Year: 2009).*
Bonveh: A Laboratory Study of the Bleaching Process in Stigmasta-3,5-diene Concentration in Olive Oils; JAOCS, vol. 78, No. 3 (2001). (Year: 2001).*
Haines: Direct Determination of MCPD Fatty Acid Esters and Glycidyl Fatty Acid Esters in Vegetable Oils by LC-TOFMS; J Am Oil Chem Soc (2011) 88:1-14, DOI 10.1007/s11746-010-1732-5; Received: May 19, 2010 / Revised: Nov. 9, 2010 / Accepted: Nov. 18, 2010 / Published online: Dec. 9, 2010. (Year: 2010).*
Collins English Dictionary: Stage; printed Feb. 9, 2022 (Year: 2022).*
Schurz: citations from EP 2361298 A1, published Aug. 31, 2011. (Year: 2011).*
Pudel: On the necessity of edible oil refining and possible sources of 3-MCPD and glycidyl esters; Eur. J. Lipid Sci. Technol. 2011, 113, 368-373; Received: Sep. 10, 2010 / Revised: Nov. 9, 2010 / Accepted: Nov. 29, 2010DOI: 10.1002/ejlt.201000460 (Year: 2010).*
Opposition by Bunge Loders Croklaan B.V. toward the Allowance of European Patent No. 2 548 941 B1 (European Patent Application No. 11756051.6—Kao Corporation), filed therein on Mar. 14, 2019 (Year: 2019).*

(Continued)

Primary Examiner — Patricia A George

(57) ABSTRACT

A refined oil composition having a reduced 3-MCPD ester and/or glycidyl ester content and methods of preparation thereof.

11 Claims, No Drawings

(56) References Cited

OTHER PUBLICATIONS

GB0707454: Process of purifying oils or fats: published on Apr. 21, 1954 (Year: 1954).*
WO2012065790, published May 24, 2012 (Year: 2012).*
"European Search Report for corresponding EP11001076, Feb. 13, 2012, 3 pages."
"European Search Report for corresponding EP16162534, Jun. 14, 2016. 1 page."
"Fats and Oils Handbook", 1998, 652-666-668.
"Flavor panel evaluation of vegetable oils, Sampling and Analysis of Commercial Fats & Olls, 2009; AOCS Recommended Practice".
"Infant formula and follow-up formula may contain harmful 3-MCPD fatty acid esters", BIR Opinion No. 047/2007.
"PCT International Search Report PCT/EP2012/000593, Mailed May 22, 2012. 3 pages."
Bonveh, "A Laboratory Study of the Bleaching Process in Stigmasta-3,5-diene Concentration in Olive Oils", JAOCS, vol. 78, No. 3 (2001).
Franke K, et al., "Influence of chemical refining process and oil type on bound 3-chloro-1, 2-propanediol contents in palm oil and rapeseed oil", LWT-Food and Technology, vol. 42, No. 10, XP-026502436, Dec. 1, 2009, 1751-1754.
Gibon V., et al., "Palm oil refining", Eur. J. Lipid Sci. Technol., 2007, 109: 315-335.
Haines, "Direct Determination of MCPD Fatty Acid Esters and Glycidyl Fatty Acid Esters in Vegetable Oils by LC-TOFMS", J Am Oil Chem Soc (2011) 88: 1-4, Doi 10.1007/s11746-010-1732-5; Received: May 19, 2010 / Revised: Nov. 9, 2010 / Accepted: Nov. 18, 2010/ Published online: Dec. 9, 2010.
Hirai, et al., "Verification of the DGF Method", May 18, 2010.
James, M. Edward, "The Refining and Bleaching of Vegetable Oils", Journal of the Americal Oil Chemists Society (JAOCS), vol. 35, No. 2 XP055500862, Feb. 1, 1995, 76-83.
Kellens, Marc, "The Oils and Fats Processing Industry Anno 2010: From Process Evolution to Technological Revolution", OFIC 2010, XP-002669068, Retrieved from the Internet: URL:http://www.mosta.org.my/PDF/Module5/1_MarcKellens.pdf, 1-49.
Larin A.N., "Basic technology of oil industry", handbook, Federal chemical technological university, Ivanovo, 2006. No English translation of Larin A.N. is provided. Larin A.N. was cited by the patent office of Ukraine, specifically for the paragraph on p. 22, An English translation of this paragraph is as follows: In industry, the bleaching of lipids (oils) is carried out at a temperature of 60-90 ° C., sometimes at 130 ° C., under vacuum.
Larsen, "3-MCPD Esters in Food Products", ILSI Europe Report Series, Int. Life Sciences Inst., Brussels, BE, pp. 1-34, XP-002608496, Retrieved from the Internet: URL:http://www.ilsi.org/europe/publication s/final%20version%203%20mcpd%20, Feb. 1, 2009, 1-34.
Matthaus B, "Potential ways of reduction of 3-MCPD esters in vegetable oils/data on mitigation".
Nagendran, "Characteristics of red palm oil, a carotene- and vitamin E-rich refined oil for food uses", Food and Nutrition Bulletin, vol. 21, No. 2 © 2000, The United Nations University.
Pudel F., et al., "On the necessity of edible oil refining and possible sources of 3-MCPD and glycidyl esters", Eur. J. Lipid Sci. Technol., 2011, 113, 368-373.
Soh Kheang Loh, et al., "Enhancement of palm oil refinery waste—Spent bleaching earth (SBE) into bio organic fertilizer and their effects on crop biomass growth", Industrial Crops and Products., NL, vol. 49, DOI: http://dx.doi.org/10.1016/j.indcrop.2013.06.016, XP055504479, Aug. 1, 2013, 775-781.
Strijowski, et al., "Removal of 3-MCPD esters and related substances after refining by adsorbent material", Eur. J. Lipid Sci. Technol. vol. 113, 2011, pp. 387-392, XP-002669067.
Strijowski U, et al. "Oberflächenadsorption kann 3-MCPD-bildende Substanzen in Pflanzenölen reduzieren", Retrieved from the Internet: URL:http://www.ovidverband.de/fileadmin/user_upload/ovid-verband.de/ downloads/OVID BLL_Informationsverans, Jan. 18, 2011.
Weisshaar, et al., "Fatty acid esters of 3-MCPD: Overview of occurrence and exposure estimates". Eur. J. Lipid Sci. Technol., vol. 113, 2011, pp. 304-308, XP-002675148.
Weisshaar, et al., "Fatty acid esters of glycidol in refined fats and oils", Eur. J. Lipid Sci. Technol., vol. 112, 2010, pp. 158-165, XP-002675147.
Weisshaar R., "3-MCPD-esters in edible fats and oils—a new and worldwide problem", Eur. J. Lipid Sci. Technol., 110, Aug. 1, 2008, 671-672.
D. Anderson, A Primer on Oils Processing Technology, Bailey's Industrial Oil and Fat Products, Sixth Edition, Six Volume Set, Chapter 1, 2005, pp. 1-29.
David R. Erickson, World Conference Proceedings, Edible Fats and Oils Processing: Basic Principles and Modern Practices, American Oll Chemists' Society, 1989, p. 156.
Ester-bound 3-Chloropropane-1, 2-diol (3-MCPD esters) and glycidol (Glycidyl esters) Determination in fats and oils by GC-MS, DGF Standard Methods (14. Supplement) 2009, Section C—Fats, pp. 1-14.
Gunstone et al. The Lipid Handbook, Second edition, 5.4 Production of Edible Oils, 1994 pp. 258-275.
Karely Hrncirik, Presentation—3-MCPD Esters Formation in Vegetable Oil Refining, Current State of Knowledge, Jan. 25, 2010, pp. 1-30.
L.H. Wiedermann, Degumming, Refining and Bleaching Soybean Oil, JAOCS 1981, World Conference on Soya Processing and Utilization, pp. 159-166, Mar. 1981.
Michael Bockisch, Fats and Oils Handbook, Chapter 7, Oil Purification, pp. 613-615, 644, 648, 649, 674, 697, 700-702, Feb. 1, 2000.
Ovid Press Information, Nov. 17, 2015, pp. 1-10.
Presentation Knut Frank & Ulf Strijowksi, German Institute of Food Technologies, Jan. 25, 2010, pp. 1-12.
Proprietor's Opposition to U.S. Pat. No. 2,548,941, Mar. 2019.
Dennis R. Taylor, Bailey's Industrial Oil and Fat Products, Sixth Edition, Six vol. Set, Chapter 7, Bleaching, 2005.
Opposition against EP2548941B1, in the name of KAO Corporation by Upfield Europe BV, pp. 1-18, Sep. 18, 2019.
Opposition by Bunge Loders Crooklaan B.V., pp. 1-14, Sep. 18, 2019.
Cock, J. D. et al., "Recent Developments in Edible Oil Deodorization", Oils & Fat, Desmet ballestra, workshop, 2010, 29 pages.
Craft Brian D, et al., "Glycidyl esters in refined palm ( ) oil and related fractions. Part II: Practical recommendations for effective mitigation", Food Chemistry, (20120000), vol. 132, pp. 73-79, 2012.
De Greyt, W., et al., Deodorization, Bailey's Industrial Oil and Fat Products, 6th Edition, vol. 5, chapter 8, pp. 341-383 (Year: 2005).
Frank Pudel et al., "On the necessity of edible oil refining and possible sources of 3-MCPD and glycidul esters," European Journal of Lipid Science and Technology, vol. 113, No. 3, Mar. 1, 2011, pp. 368-373.
Hrncirik et al., "An initial study on the formation of 3-MCPD esters during oil refining", Eur. J. Lipid Sci. Technol., vol. 113, 2011, pp. 374-379.
Johnson, L. A., et al., "Soybeans Chemistry, Production, Processing and Utilization", Chapter 12, "Soybean Oil Purification", 2008, 8 pages.
KELLENS: "The oils and Fats Processing Industry Anno 2010: From Process Evolution to Technological Revolution", 2010, pp. 1-49.
Matthaus, B. et al., "What are the possibilities to reduce the content of 3-MCPD esters in edible oils", Lipid Science and Technology, vol. 113, No. 3, 2011, pp. 380-386.
Ramli et al., "Effects of Degumming and Bleaching on 3-MCPD Esters Formation During Physical Refining" J. Am. Oil. Chem. Soc., vol. 188, Jun. 3, 2011, pp. 1839-1844.
Smidrkal, J et al., "Formation of Acylglycerol Chloro Derivatives in Vegetable Oils and Mitigation Strategy", Czech J. Food Sci., vol. 29, No. 4, 2011, pp. 449-456.

(56) References Cited

OTHER PUBLICATIONS

Strijowski et al., "Oberflachen absorption kann 3-MCPD-bildende Substanze in Pflanzenolen reduzieren", Jan. 18, 2011, Retrieved from the Internet: URL:http://www.ovid-verband.de/fileadmin/user upload/ovid-verband.de/downloads/OVIDBLL-Informationsveranstaltung Vortrag StrTjowskiDIL.pdf?PHPSESSID=eeaa3c941cab199a5e88e453667654a6 [retrieved on Feb. 6, 2012] (page No. not found).

* cited by examiner

OIL COMPOSITIONS

CROSS-REFERENCE TO RELATED APPLICATIONS

This application is a Divisional application of U.S. patent application Ser. No. 15/334,729, filed Oct. 26, 2016, and entitled "OIL COMPOSITIONS" which is a Continuation of U.S. patent application Ser. No. 13/984,562, filed Aug. 9, 2013, and entitled "OIL COMPOSITIONS" which is a National Stage Entry of International Patent Application PCT/EP12/00593, filed Feb. 9, 2012, entitled "OIL COMPOSITIONS" which claims the benefit of the European Patent Application, Ser. No. 11/001,076.6, filed Feb. 10, 2011, entitled "OIL COMPOSITIONS" all of which are hereby incorporated by reference in their entirety.

FIELD OF THE INVENTION

The present invention relates to novel oil compositions for use in the preparation of beverages and/or foodstuffs and to methods for their manufacture. In particular, the invention relates to refined oil compositions which have a very low 3-MCPD ester and/or glycidyl ester content.

BACKGROUND OF THE INVENTION

Crude oils, as extracted from their original source, are not suitable for human consumption due the presence of high levels of contaminants—such as free fatty acids, phosphatides, soaps and pigments—which may be toxic or may cause an undesirable colour, odour or taste. Crude oils are therefore refined before use. The refining process typically consists of three major steps: degumming, bleaching and deodorizing. An oil obtained after completion of the refining process (called a "refined oil") is normally considered suitable for human consumption and may therefore be used in the production of any number of foods and beverages.

Unfortunately, it has now been found that the refining process itself contributes to the introduction, into the refined oil, of high levels of 3-monochloropropane-1,2-diol fatty acid esters (3-MCPD esters) and glycidyl esters—typically in an amount of about 10-25 ppm. 3-MCPD esters and glycidyl esters are produced as a result of the oils being exposed to high temperatures during processing, in particular during deodorization. Both glycidyl esters and 3-MCPD esters are associated with a possible carcinogenic effect. In particular, there is a risk that 3-MCPD esters could be converted to free 3-MCPD in the body during digestion. Free 3-MCPD, when present in the body at high concentrations, is known to cause hyperplasia (increased cell count) in the renal tubes of animals which, in turn, can lead to the formation of tumours. A similar effect is observed for glycidyl esters which are converted to free glycidol in the body. As such, scientific expert bodies of the EU, the World Health Organisation and the Food and Agriculture Organisation have set a tolerable daily intake (TDI) of 2 micrograms free 3-MCPD per kilogram body weight for humans.

Assuming that all 3-MCPD esters present in refined oils would be converted to free 3-MCPDs, it has been calculated that a man consuming 100 g of vegetable margarine a day could exceed the above TDI by up to five times. Similarly, a baby being fed with formula (which contain about 25% fat by weight) could be exceeding the TDI by up to 20 times.

Thus, although there is still a lot of uncertainty around the effect of 3-MCPD esters and glycidyl esters on the human body, a number of regulatory bodies, including for instance the German Federal Institute for Risk Assessment, have nonetheless recommended that efforts be made to lower levels of 3-MCPD esters and glycidyl esters in refined oils. A concerted effort has therefore been made, in the oil processing industry, to identify ways of reducing 3-MCPD ester and glycidyl ester levels in refined oils.

To date, two main approaches have been suggested: the first involves sourcing crude oils which have very low levels of 3-MCPD precursors, meaning that the final refined oil will naturally have a lower 3-MCPD ester level than a standard refined oil. Unfortunately, this solution is costly and unsustainable at high volumes due to a lack of available "low 3-MCPD" oil sources. As such, the main method used in the industry to reduce 3-MCPD ester content has been to use low-temperature deodorization in order to reduce the rate of conversion from 3-MCPD precursors to 3-MCPD esters. Unfortunately, even at the lowest possible temperatures (a minimum temperature being required to maintain food safety), 3-MCPD esters will be formed in quantities that exceed maximum levels desired by the food industry. Of course, this could partially be addressed by combining low-temperature deodorization with low 3-MCPD precursor crude oils but this solution will still suffer from the obstacles and costs associated with sourcing such oils.

A further suggestion for reducing 3-MCPD ester content is made in WO2010/036450 (Süd-Chemie). It is based on a modified refining process which uses very intensive bleaching (with high amounts of bleaching clays). Unfortunately, this solution is prohibitively costly for use on an industrial scale and is not sufficiently effective: 3-MCPD ester levels are not sufficiently reduced and, moreover, the process results in high yield losses for the oil overall.

It has been observed that bleaching can cause a reduction in 3-MCPD ester levels (see WO2011/069028A1). However, bleaching also increases free fatty acid content and negatively affects taste. It must therefore be followed by a further refining step, typically deodorization, to render the oil fit for consumption.

There is therefore still a need in the industry to identify an efficient and effective method of producing refined oils with an acceptable taste and with very low 3-MCPD ester and/or glycidyl ester levels. The present invention provides such a process.

SUMMARY OF THE INVENTION

According to a first aspect of the present invention, there is provided a process for the production of a refined oil having a reduced 3-MCPD ester and/or glycidyl ester content characterized in that it comprises subjecting an oil to the following steps, in order: (a) a bleaching step, (b) a deodorization step, (c) a final bleaching step, and (d) a final deodorization step, wherein final deodorization step (d) is carried out at a temperature at least 40° C. lower than deodorization step (b), preferably at a temperature below 190° C.

According to a further aspect of the present invention, there is provided a process for the production of a refined oil having a reduced 3-MCPD ester and/or glycidyl ester content characterized in that it comprises subjecting an oil to the following steps, in order: (a) a bleaching step, (b) a deodorization step, and (c) a final bleaching step, wherein the final bleaching step (c) is carried out at a temperature below 80° C., and preferably in an oxygen-poor environment.

According to certain embodiments, the above processes may further comprise an alkali treatment step selected from an alkali refining step and an alkali interesterification step.

According to yet another aspect of the present invention, there is provided a refined oil, preferably a refined palm oil, obtainable according to one of the above processes. In particular, there is provided a refined oil having a combined 3-MCPD ester+glycidyl ester content of less than 5 ppm and a taste value, measured according to Method C, of 8 or more. There is also provided a refined oil having a non-detectable glycidyl ester content. Beverages and/or foodstuffs comprising such refined oils are also part of the present invention.

DETAILED DESCRIPTION

The present invention provides a process for the production of refined oils having a reduced 3-MCPD ester and/or glycidyl ester content.

Refined oils are oils that have undergone full refining and are suitable for use in their designated end application. In particular, they will be suitable for human consumption. Traditionally, refining has included at least a degumming step, a bleaching step and a deodorizing step, although other refining steps may also be used. A non-refined oil (i.e. an oil that has not been subjected to any refining steps) will be referred to as a crude or virgin oil. Such crude oils might be obtained by extraction with solvents (such as hexane) followed by evaporation of the solvent. The mixture of oil and solvent is called miscella but, for simplicity, will also be referred to herein as "crude oil". A partially refined oil is one that has been subjected to one or more refining steps but is not yet suitable for use in its end application. When the term "oil" is used alone, without prefix, it may refer to a non-, partially and/or fully refined oil, its meaning becoming apparent from context.

Special Processing

The present invention provides a process for the production of a refined oil having a reduced 3-MCPD ester and/or glycidyl ester content characterized in that it comprises a bleaching step followed by a deodorization step and in that it comprises a mild final refining step, i.e. a final bleaching and/or deodorization step carried out under conditions which will limit the formation of undesirable substances.

According to one possible embodiment, the process will comprise subjecting an oil to the following steps, in order: (a) a bleaching step, (b) a deodorization step, (c) a final bleaching step, and (d) a final deodorization step, wherein the final deodorization of step (d) is carried out at a temperature at least 40° C. lower than the deodorization of step (b). When carried out under such conditions, the final deodorization will be referred to as a "mild deodorization step". Preferably, the final deodorization will be performed at a temperature of 190° C. or less, more preferably at a temperature of 180° C. or less, even more preferably at a temperature of 160° C. or less, for example at a temperature in the range of 140-160° C. or 130-160° C.

According to another possible embodiment, the process will comprise subjecting an oil to the following steps, in order: (a) a bleaching step, (b) a deodorization step, and (c) a final bleaching step, wherein the final bleaching step (c) is carried out at a temperature below 80° C. When carried out under such conditions, the final bleaching step will be referred to as a "mild bleaching step". Under these conditions, it has been found that a further deodorization is not necessary. Preferably, the final bleaching step will be performed at a temperature of 70° C. or less, for example at a temperature in the range of 50-70° C. Ideally, it will be performed in an oxygen-poor environment. An oxygen-poor environment will be understood as an environment or set-up capable of significantly reducing the oil's contact with oxygen. Preferably, the oxygen-poor environment will be substantially devoid of oxygen. The final bleaching step may, for instance, be performed in an inert gas (e.g. under nitrogen atmosphere) or in a fixed bed column (or similar structured filter systems). Although it should not be necessary, if a subsequent deodorization is used, it will be a final deodorization as described above (i.e. preferably performed at a temperature of 190° C. or less).

Bleaching

Bleaching is a process whereby impurities are removed to improve the color and flavor of the oil. It is typically performed prior to deodorization. The nature of the bleaching step will depend, at least in part, on the nature and quality of the oil being bleached. Generally, a crude or partially refined oil will be mixed with a bleaching agent which combines with oxidation products (e.g. peroxides), trace phosphatides, trace soaps, pigments and other compounds to enable their removal. The nature of the bleaching agent can be selected to match the nature of the crude or partially refined oil to yield a desirable bleached oil. Bleaching agents generally include natural or "activated" bleaching clays, also referred to as "bleaching earths", activated carbon and various silicates. A skilled person will be able to select a suitable bleaching agent from those that are commercially available based on the oil being refined and the desired end use of that oil.

The processes of the present invention will include at least two bleaching steps. If the final bleaching step is followed by a deodorization step, these may be the same or similar (e.g. with the same bleaching agents and performed under similar conditions)—the final bleaching step could even be more intense that the preceding one(s). Preferably, however, the final bleaching step will be a mild bleaching step, i.e. less intensive than the preceding one(s). For example, the final bleaching step may be performed with less bleaching agent (or less active bleaching agent), at lower temperatures and/or with a reduced retention time, or in bleaching equipment that will have less impact on taste and free fatty acid formation (i.e. in an oxygen-poor environment as described above).

Thus, the process of the present invention will include a first bleaching step followed by a first deodorization step and a final bleaching step which may, or may not, be followed by a final deodorization step.

Deodorization

Deodorization is a process whereby free fatty acids (FFAs) and other volatile impurities are removed by treating (or "stripping") a crude or partially refined oil with steam, nitrogen or other inert gasses. The deodorization process and its many variations and manipulations are well known in the art and the deodorization step(s) of the present invention may be based on a single variation or on multiple variations thereof.

For instance, deodorizers may be selected from any of a wide variety of commercially available systems, including both multi-chamber deodorizers (such as those sold by Krupp of Hamburg, Germany; De Smet Group, S.A. of Brussels, Belgium; Gianazza Technology s.r.l. of Legnano, Italy; Alfa Laval AB of Lund, Sweden, or others) and multi-tray deodorizers (such as those sold by Krupp, DeSmet Group, S.A., and Crown Ironworks of the United States).

If the process of the present invention includes two (or more) deodorization steps, a separate deodorizer will typically be used for each deodorization step. Each deodorizer may be of the same make, type, set-up, etc. or they may be different—provided that, if more than one deodorization step is used, the final deodorization is a mild deodorization step. According to one possible set-up, however, the multiple deodorizations may be performed in a single deodorization apparatus. According to this embodiment, an oil outlet would be provided such that the oil would leave the deodorizer after initial high-temperature deodorization (by which it is meant that the initial deodorization will include at least one high-temperature deodorization stage). It would then be bleached and reintroduced into the deodorizer via an inlet positioned such that the oil would re-enter the deodorizer and be subjected to less high-temperature deodorization (i.e. deodorization at a temperature at least 40° C. lower than the highest deodorization temperature used during the initial deodorization). This could be done, for example, in a multi-tray or multi-chamber deodorizer. In these deodorizers, heat exchangers are positioned such that, for instance, in the top tray or chamber, oils are subjected to deodorization at 270° C. In the next tray or chamber, the deodorization temperature will be 250° C., and so on until, in the bottom trays, the deodorization temperatures are 140° C. or 120° C. Thus, the oil outlet could be positioned below a first set of trays/chambers such that the oil would leave the deodorizer after deodorization at 200° C., for example. The oil inlet would then be positioned such that the oil would be reintroduced into a tray/chamber in which deodorization is performed at 190° C. or less. It would then be allowed to continue through the tray/chambers until it reached the end/bottom of the deodorizer.

Deodorization is typically carried out at elevated temperatures and reduced pressure to better volatilize the FFAs and other impurities. The precise temperature and pressure may vary depending on the nature and quality of the oil being processed. The pressure, for instance, will preferably be no greater than 10 mm Hg but certain embodiments may benefit from a pressure below or equal to 5 mm Hg, e.g. 1-4 mm Hg. The temperature in the deodorizer may be varied as desired to optimize the yield and quality of the deodorized oil. At higher temperatures, reactions which may degrade the quality of the oil will proceed more quickly. For example, at higher temperatures, cis-fatty acids may be converted into their less desirable trans form. Operating the deodorizer at lower temperatures may minimize the cis-to-trans conversion, but will generally take longer or require more stripping medium or lower pressure to remove the requisite percentage of volatile impurities. As such, deodorization is typically performed at a temperature in a range of 200 to 280° C., with temperatures of about 220-270° C. being useful for many oils (note: the temperatures reflect the temperatures reached by the oils in the deodorizer rather than, for example, that of the steam used during the process).

According to one embodiment of the present invention, a first deodorization step will be carried out at a temperature within these typical ranges (i.e. from 200 to 280° C., preferably from 220 to 270° C.). For palm oil, the preferred temperature range for the first deodorization will be 240 to 270° C. If used, the final deodorization step will be performed at a temperature at least 40° C. lower than the first deodorization step. Preferably, the final deodorization step will be performed at a temperature of 190° C. or less, preferably at a temperature of 180° C. or less, more preferably at a temperature of 160° C. or less, for example at a temperature in the range of 140-160° C. or 130-160° C.

Thus, the process of the present invention will include a first bleaching step and a first deodorization step followed by a final bleaching step and, optionally, a final deodorization step. It may also include one or more alkali treatment steps.

Alkali Treatment

According to a preferred embodiment, the process of the present invention may also include one or more alkali treatment steps. The term "alkali treatment" as used herein should not be understood as referring only to the traditional chemical refining process known as "alkali refining" but, instead, to any treatment of the oil with an alkali (i.e. to any process in which the crude or partially refined oil is brought into contact with an alkali), as will become apparent below.

•Alkali Refining

According to one specific embodiment, the alkali treatment will consist of an alkali refining type step comprising: (a) mixing a crude or partially refined oil with an aqueous alkali solution to produce a mixture of partially refined oil and soapstock; (b) separating off the soapstock (e.g. using a centrifuge or a settling tank); and (c) washing the partially refined oil (preferably with water at a temperature in the range 70-105° C.). The washed, partially refined oil can then be delivered to the next refining step (note: in the case of miscella, alkali refining will result in a neutralized, washed miscella which will first have to be subjected to evaporation before the oil can be delivered to the next refining step).

Alkalis which can be used for alkali refining will typically be strong alkalis such as sodium hydroxide or sodium carbonate. Sodium hydroxide, for instance, will preferably be used at a concentration of approximately 25%. This and other possible variations of the alkali refining step will be apparent to the person skilled in the art and need not, therefore, be described in detail here.

Without wishing to be bound by theory, it is thought that this alkali refining step will allow for 3-MCPD ester and/or glycidyl ester precursors to be removed from the crude or partially refined oil, thus reducing the overall number of 3-MCPD esters and/or glycidyl esters formed during further processing (e.g. during deodorizing). As such, when used, this type of alkali treatment step will preferably be performed prior to the first deodorization step, more preferably prior to the first bleaching step.

•Alkali Interesterification

According to a further embodiment of the present invention, the alkali treatment step may be an alkali interesterification step, performed by bringing a crude or partially refined oil into contact with an alkaline interesterification catalyst.

Interesterification is used to change the acyl-glycerol profile of an oil (in particular by exchanging fatty acids between different triglycerides). Again, without wishing to be bound by theory, it is thought that the alkali interesterification step allows for the removal of 3-MCPD esters and/or glycidyl esters themselves from a treated oil. As such, when used, the alkali interesterification step will preferably be performed after the first deodorization step and, more preferably, prior to the final bleaching step.

A number of alkaline interesterification catalysts are known in the art. These include, by way of example only, sodium alcoholates and potassium alcoholates such as sodium methoxide and/or sodium ethoxide; sodium stearate; sodium hydroxide and potassium hydroxide. Any of these may be used for the purposes of the present invention. According to one particular embodiment, sodium methoxide is used, preferably at levels of approximately 0.05 to 0.1% by weight. Advantageously, the oil to be treated will be brought into contact with the alkaline interesterification catalyst under vacuum and at a temperature in the range of 80 to 120° C. Contact will preferably be maintained for 30 to 90 minutes. This will typically result in full interesterification of the oil although it should be noted that actual interesterification is not thought to be necessary to achieve reduced 3-MCPD ester levels.

According to one particular embodiment, the process of the present invention may include multiple alkali treatment steps. For example, it may include an alkali refining type step prior to the first deodorization and an alkali interesterification step subsequent to the first deodorization. Other possible permutations will be apparent to a person skilled in the art.

Thus, by way of illustration, possible embodiments of the present invention include:

(I) subjecting an oil to (a) an alkali refining step, (b) a bleaching step, (c) a deodorization step, (d) a final bleaching step, and (e) a final, mild deodorization step.

(II) subjecting an oil to (a) a bleaching step, (b) a deodorization step, (c) an alkali interesterification step, (d) a final bleaching step, and (e) a final, mild deodorization step.

(III) subjecting an oil to (a) an alkali refining step, (b) a bleaching step, (c) a deodorization step, (d) an alkali interesterification step, (e) a final bleaching step, and (f) a final, mild deodorization step.

(IV) subjecting an oil to (a) an alkali refining step, (b) a bleaching step, (c) a deodorization step, and (d) a final, mild bleaching step.

(V) subjecting an oil to (a) a bleaching step, (b) a deodorization step, (c) an alkali interesterification step and (d) a final, mild bleaching step.

(VI) subjecting an oil to (a) an alkali refining step, (b) a bleaching step, (c) a deodorization step, (d) an alkali interesterification step and (e) a final, mild bleaching step.

Additional Steps

In addition to the refining steps described above, the process of the present invention may include one or more additional refining or treatment steps. For example, the crude or partially refined oil may be subjected to one or more degumming steps. Any of a variety of degumming processes known in the art may be used. One such process (known as "water degumming") includes mixing water with the oil and separating the resulting mixture into an oil component and an oil-insoluble hydrated phosphatides component, sometimes referred to as "wet gum" or "wet lecithin". Alternatively, phosphatide content can be reduced (or further reduced) by other degumming processes, such as acid degumming (using citric or phosphoric acid for instance), enzymatic degumming (e.g., ENZYMAX from Lurgi) or chemical degumming (e.g., SUPERIUNI degumming from Unilever or TOP degumming from VandeMoortele/Dijkstra CS). If a degumming step is used, it will preferably precede the first bleaching step.

The process may also optionally include one or more neutralization steps (before the first bleaching), any kind of dewaxing (at any place in the process), fractionation (at any place in the process), The process of the invention may also include one or more chemical or enzymatic modification steps, including for instance hydrogenation and/or interesterification. Hydrogenation will preferably be performed before either the first deodorization step or the final bleaching step. Chemical interesterification will preferably be performed after the initial deodorization and prior to the final deodorization, if used. If the oil being treated according to the present process has a relatively low FFA content, it may also be performed prior to the initial deodorization. Enzymatic interesterification can be performed at any point in the process and will preferably be performed with a lipase enzyme. Advantageously, it has been found that when performed after the initial deodorization step, enzymatic interesterification could be used as an alternative to the second bleaching step, or could be carried out at the same time, in the same process (e.g. batch wise or in a fixed bed column).

The process may also include—or indeed be preceded or followed by—one or more blending steps. It may be desirable, for instance, to blend oils of different types or from multiple sources. For example, a number of crude or partially refined oils could be blended before the first bleaching step. Alternatively, two or more refined oils could be blended after the final refining step or partially refined oils could be blended at an intermediate stage.

Many permutations and variations of the present process are possible. These will be apparent to a skilled person depending on the nature of the crude oil being used as a starting material and/or on the type of refined oil being produced and its desired end use. The only restriction that will be imposed is that the oil should not be subjected to any treatment steps, after the final mild refining (i.e. bleaching and/or deodorization) step, which could significantly increase levels of 3-MCPD esters and/or glycidyl ester in the oil beyond a target level.

Products

Refined oils obtained through the above process are also part of the present invention. Specifically, there is provided a refined oil having a reduced 3-MCPD ester and/or glycidyl ester content. The refined oils may be derived from crude or partially refined oils of any type, source or origin. They may be derived, for example, from one or more vegetable and/or animal sources and may include oils and/or fats from a single origin or blends of two or more oils and/or fats from different sources or with different characteristics. They may be derived from standard oils or from specialty oils such as low 3-MCPD oils, from modified or unmodified oils and/or fats (i.e. from oils in their natural state or oils that have been subjected to a chemical or enzymatic modification or to fractionation) and so on. Preferably, they will be derived from vegetable oils or vegetable oil blends. Examples of suitable vegetable oils include: soybean oil, corn oil, cottonseed oil, palm oil, palm kernel oil, peanut oil, rapeseed oil, safflower oil, sunflower oil, sesame seed oil, rice bran oil, coconut oil, canola oil and any fractions or derivatives thereof. According to a particularly preferred embodiment, the refined oils of the present invention will be derived from palm oil.

Different oils contain different levels of 3-MCPD ester and glycidyl ester precursors and therefore give rise to different levels of 3-MCPD esters and glycidyl esters after processing. The refined oils of the present invention will have a reduced 3-MCPD ester and/or glycidyl ester content, where the term "reduced" refers to a 3-MCPD ester and/or glycidyl ester content which is lower than that of a corresponding oil obtained by standard refining (i.e. standard degumming, bleaching and deodorization). Preferably, the refined oils will have a combined 3-MCPD ester and glycidyl ester content which is at least 50% lower than that of the corresponding oil obtained by standard refining. More preferably, the combined 3-MCPD ester and glycidyl ester content will be at least 60% lower, more preferably at least 70% lower, more preferably at least 80% lower, more preferably at least 90% lower.

Taking palm oil by way of example, when refined by standard physical refining (degumming, bleaching, deodorization), it has a combined 3-MCPD ester and glycidyl ester content of 15 to 25 ppm. By comparison, a refined palm oil of the invention (or obtainable according to the process of the invention) will have a combined content of 3-MCPD esters and glycidyl esters ("M+G") of no more than 5 ppm, preferably no more than 3 ppm, more preferably no more than 2 ppm, more preferably no more than 1 ppm, more preferably no more than 0.5 ppm. According to certain particular embodiments, it will have a combined M+G content of 2.5 to 5 ppm. Alternatively, it may have a combined M+G content of 1 to 3 ppm. Alternatively, it may have a combined M+G content of 1 to 2.5 ppm. Alternatively, they it may have a combined M+G content of 0.3 to 1.7 ppm. Alternatively, it may have a combined M+G content of 0.5 to 1 ppm.

Unless specified otherwise, the combined content of 3-MCPD esters and glycidyl esters will be determined using Method A (DGF Standard Methods Section C (Fats) C-III 18(09) Option A. 3-MCPD ester content alone can be determined by Method B (DGF Standard Methods Section C (Fats) C-III 18(09) Option B). Glycidyl ester content can thus be calculated as the result of Method A minus the result of Method B.

Advantageously, the process of the present invention will be capable of producing oils with undetectable levels of glycidyl esters. By "undetectable", it is meant that any glycidyl esters that are measured will be within the margin of error the test method. For instance, the refined oil may have a glycidyl ester content of 0.05 ppm or less, more preferably of 0.01 ppm or less.

The refined oils will also, preferably, have a FFA content of less than 0.1%, more preferably less than 0.05% by weight—to avoid off-putting or unpleasant odor and/or taste. In fact, the refined oils of the present invention will ideally have a taste value, measured according to Method C, of 8 or more, preferably of 9 or more.

Beverages and Foodstuffs

The refined oils of the present invention may be packaged and sold as such (i.e. as low 3-MCPD/low glycidyl ester oils) or they may be further blended with one or more other oils or oil compositions and/or with one or more other ingredients, including, if desired, with one or more additives. Where the refined oils of the invention are blended with one or more other oils, these will preferably be deodorized oils and, even more preferably, refined oils obtainable according to the process of the invention.

These refined oils and refined oil blends may be used for any desired purpose, e.g. in the food and beverage industry. Thus, according to one particular embodiment, the present invention provides a food and/or beverage composition comprising a refined oil or refined oil blend as described above.

The refined oils of the invention may, for example, be used in bakery products (e.g. cakes, breads, doughs, pastries, batters, etc.), culinary products (e.g. bouillons, frozen products (e.g. pizzas, fries, etc.) or dairy products (e.g. cheese products, yogurts, ice-creams, etc.), in fat-based products per se (such as margarines or frying oils), in infant formulas, nutritional supplements and so on, just like any other oil or oil blend. The refined oils of the present invention will be particularly suitable for use in infant formula and/or other infant nutrition products. Preferably, they will be used in infant nutrition products to replace other oils and/or fats.

METHODS and EXAMPLES

Method C

The flavor of refined oils and fats is an important criterion for judging the quality of the oil; mainly products of oxidation are recognized during tasting.

•Taste Area

The tasting testing area should be located in a clean and neutral surrounding.

•Sample Taking

Each batch of refined oils/fats should be evaluated on taste. A representative sample of a tank shall be taken to taste the oil. Taking of the sample should be done according to the applicable local instruction. To take a representative sample sufficient flushing might be needed. If oils are stored before testing, they must be stored appropriately (i.e. not at high temperatures).

•Sample Preparation/Materials

| Utensils used for tasting | Waste cups |
| White background | Drinking water at 38° C. |
| Clean cups | Microwave/oven |

When the sampling bottles are dirty either on the outside or on the inside; pour the oil/fat into a glass beaker, to prevent off flavors from the dirty bottle. Before the tasting can start the samples must be at specific temperatures: vegetable oils are tasted at room temperature; fats are tasted at a temperature of ±50° C. (or 10° C. above melting point). Fats can be warmed in an oven or microwave to reach this temperature.

•Odor and Flavoring Testing Methods 1 or 2 taste panel members (who are trained and qualified to taste oils) should taste-test each batch of refined oils/fat. They must first clean their mouth with water (moderately warm about 38° C.) and evaluate the oil/fat for odor (swirling the oil/fat before sniffing). 10 ml of the oil/fat is then taken into the mouth and thoroughly rolled throughout the mouth (at least 10 s, without swallowing). The oil/fat is then spat out into a waste cup and any after-taste is noted. If a further samples needs to be tested, the tester must rinse their mouth with warm water (about 38° C.) between each sample.

The following must be taken into account: fats should not starch in the mouth, nor be too hot as this influences the taste-feeling; to release the flavors in oil/fats you must alternately suck up some air through the mouth and circulate with the tongue; taste-testing must not be performed within half an hour of smoking, drinking coffee or eating. In general, the first sample will not have such a good score. This is because the taste person has to overcome the aversion from taking oil/fat in the mouth. Therefore it is recommended to re-taste the first sample after 3 or 4 tasted oil/fats.

Evaluation

The oil is evaluated using a rating scale to judge the quality. This rating scale is based on the scales mentioned in AOCS Cg 2-83, and goes from 1 till 10—with 8 or higher being considered good, i.e. having a bland taste.

| Score | Intensity level |
| --- | --- |
| 10 | Zero |
| 9 | Trace |

-continued

| Score | Intensity level |
|---|---|
| 8 | Faint |
| 7 | Slight |
| 6 | Mild |
| 5 | Moderate |
| 4 | Definite |
| 3 | Strong |
| 2 | Very strong |
| 1 | Extreme |

Bland is defined as an oil/fat that has no off-taste, which negatively influences the flavor of the oil. It does not mean that the oil has no flavor.

Example 1 (Reference)

Crude palm oil with FFA of 5.52% was alkali refined (at industrial scale) using 5.4% sodium hydroxide solution (20%). Neutralization was carried out by mixing and centrifugation at 105° C. Washing after separation is done with 10% water under same conditions. Bleaching with 1% Taiko classic G was done for 37 min at 98° C. Deodorization was carried out for 50 min at 240° C. and 4 mbar using 2% sparge steam.

From this standard production samples were taken, showing on average: 0.65 ppm 3-MCPD, and 2.13 ppm 3-MCPD+Glycidol (i.e. 0.99 ppm glycidol).

After $2^{nd}$ bleaching of this oil with 0.5% bleaching clay (Taiko classic G) for 30 min at 100° C., the product showed 0.65 ppm 3-MCPD and 0.66 ppm 3-MCPD+Glycidol. The taste, however, had a strong off-flavor suggesting a significant increase in FFA levels. A further physical refining under standard conditions was therefore performed and resulted, on average, in 3.43 ppm 3-MCPD and 10.02 ppm 3-MCPD+Glycidol (meaning 4.42 ppm Glycidol).

Example 2 (Mild Final Deodorization)

An alkali refined palm oil obtained according above description (without the $2^{nd}$ bleaching and deodorization) was re-bleached with 0.5% bleaching clay (Izegem BC) and deodorized at temperatures of 183.7° C., 188.1° C. and 196.3° C., respectively. The oils obtained were analyzed and the results are shown below:

| Deo. Temp. | 3-MCPD (ppm) | 3-MCPD + Glycidol (ppm) | Glycidol (ppm) |
|---|---|---|---|
| 196.3° C. | 0.73 | 0.85 | 0.080 |
| 188.1° C. | 0.67 | 0.71 | 0.027 |
| 183.7° C. | 0.67 | 0.68 | 0.007 |

As can be seen from these results, the final mild refining step results in oils with a very low 3-MCPD ester and glycidol ester levels. In fact, at deodorization temperatures below 190° C., glycidyl ester levels are effectively undetectable.

Example 3 (Taste Analysis)

In a pilot system for bleaching and deodorization, 25 kg of physically refined palm oil (standard RBD Palm Oil) was re-bleached with 0.5% Taiko classic G at 100° C. The product was filtered and then deodorized at temperatures between 120 and 220° C. At each set-point, the temperature was maintained for 30 min, a taste sample was taken and the temperature was then increased to the next set-point. Taste analysis (according to Method C) is given in the table below, demonstrating that, from 140° C. onwards, all samples were as good in taste as the standard RBD Palm Oil and that, even at 120° C., the samples still have a very good, bland flavor.

| Sample: | Taste |
|---|---|
| RBD Palm Oil | 9 |
| RBD re-bleached palm oil | 4 |
| RBD re-bleached and re-deodorized @ 120° C. | 8 |
| RBD re-bleached and re-deodorized @ 140° C. | 9 |
| RBD re-bleached and re-deodorized @ 160° C. | 9 |
| RBD re-bleached and re-deodorized @ 180° C. | 9 |
| RBD re-bleached and re-deodorized @ 200° C. | 9 |
| RBD re-bleached and re-deodorized @ 220° C. | 9 |

Example 4

In a pilot system for bleaching and deodorization, 25 kg of physically refined (RDB) palm oil was re-bleached with 0.5% Taiko classic G at 100° C. The product was filtered and deodorized at 140° C. Taste and 3-MCPD and Glycidol data are given in the table below, demonstrating that, at 140° C., taste was again as good as for the RBD palm oil being tested, and that 3-MCPD/Glycidol values did not increase again after further deodorization.

| Sample: | Taste | 3-MCPD + Glycidol | 3-MCPD |
|---|---|---|---|
| RBD Palm Oil | 8 | 21.29 | 2.86 |
| RBD re-bleached palm oil | 4 | 2.78 | 2.77 |
| RBD re-bleached and re-deodorized @ 140° C. for 60 min | 8 | 2.77 | 2.59 |

Example 5 (Mild Final Bleaching)

Re-bleaching of 150 ml RBD palm oil was carried out using 0.2% Taiko classic G. Bleaching was done for 30 min at 70° C., 85° C. and 100° C. under vacuum. All filling steps and filtration was done under atmospheric conditions. Below table shows the 3-MCPD content data and taste analysis. The advantage of lower temperature in bleaching on taste could be demonstrated.

| Re-bleaching temperature [° C.] | Taste | 3-MCPD + Glycidol [ppm] | 3-MCPD [ppm] |
|---|---|---|---|
| 100° C. | 4 | 2.36 | n.m. |
| 85° C. | 6 | 3.22 | n.m. |
| 70° C. | 7 | 5.26 | n.m. |
| Standard RBD | 9 | 9.44 | 2.40 |

(n.m. = not measured)

Example 6 (Bleaching in Oxygen-Poor Environment)

Re-bleaching of 150 ml RBD palm oil was carried out using 0.2% Taiko classic G. Bleaching was done for 1 h at 70° C. and 85° C., under vacuum. All filling steps and filtration was done under nitrogen atmosphere. Below table shows the 3-MCPD content data and taste analysis. Under nitrogen atmosphere the results for taste were significantly better. Even at prolonged bleaching time, the bleaching did not lower the taste evaluation compared to the RBD palm oil being tested, while glycidol removal was complete.

| Temperature [° C.] | Taste | 3-MCPD + Glycidol [ppm] | 3-MCPD [ppm] |
|---|---|---|---|
| 85 | 8 | 3.63 | n.m. |
| 70 | 8 | 3.97 | n.m. |
| RBD | 7 | 16.7 | 3.54 |

Example 7

At industrial scale, 28 mt RBD Palm oil (deodorized at 270° C.) was chemically interesterified using 0.1% sodium methoxide as interesterification catalyst. After 1 h reaction at 95° C., catalyst was neutralized with water and washed out. After bleaching with 0.5% BC at 100° C. and deodorization at 235° C., product was re-bleached and deodorized at 220° C.

| Sample | 3-MCPD [ppm] | 3-MCPD + Glycidol [ppm] | Glycidol [ppm] |
|---|---|---|---|
| RBD-Palm Oil | 3.22 | 41.6 | 25.71 |
| After chemical interesterification and 1st bleaching | 0.47 | 1.28 | 0.54 |
| After deodorization at 235° C. | 0.63 | 2.84 | 1.48 |
| After re-bleaching | 0.66 | 0.67 | 0.01 |
| After deodorization at 220° C. | 0.64 | 1.13 | 0.33 |

The invention claimed is:

1. A process for the production of a refined oil having a reduced 3-MCPD ester and glycidyl ester content, the process comprising:
   subjecting an oil to bleaching and deodorization consisting of:
   (a) bleaching the oil with activated bleaching clay to form a first bleached oil,
   (b) deodorizing the first bleached oil at a temperature in a range of 200° C. to 280° C. to form a first deodorized oil,
   (c) bleaching the first deodorized oil with activated bleaching clay to form a second bleached oil, and
   (d) deodorizing the second bleached oil at a temperature of 130° C. to 160° C.;
   wherein:
   the bleaching and deodorization reduce the combined 3-MCPD ester and glycidyl ester content of the refined oil to no more than 5 ppm and reduce free fatty acid (FFA) content of the refined oil to less than 0.1% by weight; and
   the oil is palm oil containing 3-MCPD ester and glycidyl ester.

2. The process according to claim 1 wherein the bleaching (c) is carried out at a temperature below 80° C.

3. The process according to claim 1 further comprising one or more alkali treatment steps.

4. The process according to claim 1, wherein the combined 3-MCPD ester and glycidyl ester content is no more than 3 ppm.

5. The process according to claim 1, wherein the combined 3-MCPD ester and glycidyl ester content is no more than 2 ppm.

6. The process according to claim 1 further comprising a degumming step prior to subjecting the oil to bleaching and deodorization steps.

7. The process according to claim 1 further comprising one or more of the following additional steps selected from neutralization, dewaxing, fractionation, hydrogenation, interesterification, blending with two or more different refined oils, or combinations thereof.

8. The process according to claim 1, wherein the refined oil has a combined 3-MCPD ester and glycidyl ester content that is at least 50% lower than that of an oil obtained by standard physical refining, wherein standard physical refining comprises degumming, bleaching, and deodorization.

9. The process according to claim 1, wherein the refined oil has a combined 3-MCPD ester and glycidyl ester content that is at least 90% lower than that of an oil obtained by standard physical refining, wherein standard physical refining comprises degumming, bleaching, and deodorization.

10. The process according to claim 1, wherein the combined 3-MCPD ester and glycidyl ester content of the refined oil is no more than 1 ppm.

11. The process according to claim 1, wherein the combined 3-MCPD ester and glycidyl ester content of the refined oil is from 0.3 ppm to 1 ppm.

* * * * *